(12) United States Patent
Bridger

(10) Patent No.: US 6,187,079 B1
(45) Date of Patent: Feb. 13, 2001

(54) THREE-PHASE SEPARATOR

(75) Inventor: Philip J. Bridger, Rugby (GB)

(73) Assignee: Baker Hughes Incorporated, Houston, TX (US)

( * ) Notice: Under 35 U.S.C. 154(b), the term of this patent shall be extended for 0 days.

(21) Appl. No.: 09/309,566

(22) Filed: May 11, 1999

Related U.S. Application Data

(60) Provisional application No. 60/085,154, filed on May 17, 1998.

(51) Int. Cl.$^7$ .................................................. B01D 19/00
(52) U.S. Cl. ............................. 96/179; 95/253; 95/262; 96/182; 96/184; 96/188; 96/198; 96/219; 96/220
(58) Field of Search .................... 95/253, 262, 254, 95/260; 96/176, 179, 182, 183, 184, 188, 189, 192, 198, 219, 220

(56) References Cited

U.S. PATENT DOCUMENTS

| | | |
|---|---|---|
| 1,458,805 | 6/1923 | Christensen . |
| 1,732,386 | 10/1929 | Sprockhoff . |
| 1,946,414 | 2/1934 | Schmid . |
| 2,179,131 | 11/1939 | Millard . |
| 2,595,602 * | 5/1952 | Parks ..................................... 96/179 |
| 2,601,903 | 7/1952 | Erwin . |
| 2,601,904 | 7/1952 | Erwin . |
| 2,614,648 * | 10/1952 | Wilson .................................. 96/176 |
| 2,656,896 * | 10/1953 | Glasgow ................................ 96/176 |
| 2,710,071 * | 6/1955 | Kinser et al. ......................... 96/184 |
| 2,751,998 | 6/1956 | Glasgow . |
| 2,882,995 | 4/1959 | Smith . |
| 3,255,574 | 6/1966 | Glasgow . |
| 3,346,122 | 10/1967 | Cornelissen . |
| 3,432,991 | 3/1969 | Sauder et al. . |
| 3,722,184 * | 3/1973 | McMinn ................................. 96/184 |
| 3,837,501 | 9/1974 | Pielkenrood . |
| 4,059,517 | 11/1977 | Strahorn et al. . |
| 4,272,359 | 6/1981 | Owen . |
| 4,329,159 * | 5/1982 | Bull ....................................... 95/253 |
| 4,385,986 | 5/1983 | Jaisinghani et al. . |
| 4,396,404 | 8/1983 | Engelman et al. . |
| 4,539,023 * | 9/1985 | Boley ................................... 96/184 |
| 4,583,998 * | 4/1986 | Reid et al. ............................ 96/184 |
| 4,737,288 | 4/1988 | Melis et al. . |
| 4,842,622 | 6/1989 | Wamsley, Jr. . |
| 4,919,777 * | 4/1990 | Bull ....................................... 96/184 |
| 4,936,990 | 6/1990 | Brunsell et al. . |
| 4,995,495 * | 2/1991 | Krynski ................................ 96/184 |
| 5,064,448 | 11/1991 | Choi . |
| 5,132,011 | 7/1992 | Ferris . |

(List continued on next page.)

FOREIGN PATENT DOCUMENTS

| | | | |
|---|---|---|---|
| 1478-459 | 6/1977 | (GB) . | |
| 645674 * | 2/1979 | (SU) | ................................ 96/176 |
| 691152 * | 10/1979 | (SU) | ................................ 96/179 |
| 1165-423 | 7/1985 | (SU) . | |
| 1666142 * | 7/1991 | (SU) | ................................ 96/176 |

Primary Examiner—Duane S. Smith
(74) Attorney, Agent, or Firm—R. Neil Sudol; Henry D. Coleman

(57) ABSTRACT

A motion insensitive phase separator for separating oilfield production fluid phases includes a tank having a pair of opposing inlets and three generally centrally arranged outlets for different phases of a production fluid mixture fed into the tank simultaneously through the inlets. Separation media is disposed in the tank for separating the different phases of the production fluid, The separation media include antifoam media at opposite ends of the tank and further includes demisting media proximately to the median plane, on opposite sides thereof. Flow regulators, such as perforated plates, are disposed substantially vertically in the tank between the antifoam media and the demisting media. The separation media and the flow regulators are disposed generally symmetrically about a central transverse plane, thereby providing for a symmetrical flow and weight distribution for motion insensitivity.

62 Claims, 1 Drawing Sheet

U.S. PATENT DOCUMENTS

| | | |
|---|---|---|
| 5,134,944 | 8/1992 | Keller et al. . |
| 5,154,735 | 10/1992 | Dinsmore et al. . |
| 5,161,619 | 11/1992 | Bollich . |
| 5,415,776 | 5/1995 | Homan . |
| 5,427,685 * | 6/1995 | Thorley ................................. 96/189 |
| 5,656,173 | 8/1997 | Jordan et al. . |

* cited by examiner

THREE-PHASE SEPARATOR

CROSS-REFERENCE TO RELATED APPLICATION

This application relies for priority purposes on U.S. provisional application Ser. No. 60/085,154 filed May 17, 1998.

BACKGROUND OF THE INVENTION

This invention relates to a phase separator. More particularly, this invention relates to a motion-insensitive phase separator for use in marine applications.

Phase separators are used in the oil industry to separate oil and gas from water in a multi-phase production fluid from a well bore. Most oil deposits occur in combination with water and gas. Frequently, because of the high geologic pressures involved, the oil is more or less homogeneously mixed in with the water, and the gas is dissolved in the mixture. Phase separators serve to separate out the three phases so that the oil and gas can be further processed.

Where drilling for oil and gas is undertaken over an ocean or other body of water, the phase separators are frequently located on a vessel maintained in position at sea. One problem arising in these installations is that the motion of the vessel and consequently of the phase separator causes the incoming fluid mixture to slosh about within the separator, thereby generating foam and impeding the separation process.

Separators which are used at sea are generally provided with structure for combating the effects of wave induced motion. As illustrated in FIG. 1, one such prior art phase separator includes a tank 12 having a single, centrally located, inlet 14. A packed box distributor 16 is disposed at the inlet 14 for spreading out the incoming fluid mixture throughout the tank 12. Tank 12 is provided with a pair of spaced gas outlets 18 and 20, a centrally located water outlet 22 and a centrally located oil outlet 24. A liquid containing chamber 26 is defined inside tank 12 by a separator plate 28 and a pair of partitions 30 and 32 in which respective flapper valves 34 and 36 are located. Water outlet 22 and oil outlet 24 communicate with chamber 26. Water outlet 22 is located at a bottom of tank 12, below a water level or water-oil interface 38, while oil outlet 24 is located between water level 38 and an oil level or oil-gas interface 40. Also located inside chamber 26 are separation media in the form of a plurality of packing structures 42 which serve to separate the oil and the water components from one another.

FIG. 2 depicts another separator designed specifically for marine applications. An elongate tank 44 is provided at one end with an inlet 46 for delivering a fluid mixture to tank 44. At an opposite end of tank 44 are provided a gas outlet 48, a water outlet 50 and an oil outlet 52. A cyclonic presparator inlet device 54 is located at inlet 46, while a plurality of packing structures or perforated plates 56 are disposed at the bottom of tank 44 between inlet 46 and outlets 48, 50, and 52. Water outlet 50 is located at a bottom of tank 44, below a water level or water-oil interface 58, while oil outlet 52 is located between water level 58 and an oil level or oil-gas interface 60.

SUMMARY OF THE INVENTION

A motion-insensitive phase separator for separating oilfield production fluid phases comprises, in accordance with the present invention, a tank having a pair of opposing inlets and generally centrally arranged outlets for liquid phases of a production fluid mixture fed into the tank simultaneously through the inlets. Separation media are disposed in the tank for separating the different phases of the production fluid. The separation media extend across a fluid flow path which in turn extends from the inlets to the outlets. Preferably, the inlets are disposed substantially equidistantly from the outlets, while the fluid permeable phase separation media is disposed in said tank generally symmetrically about the outlets. This structure provides for a symmetrical flow and weight distribution for motion insensitivity.

Generally, it is contemplated that there are at least three outlets for oil, water and gas, respectively. In this case, the separator is a three-phase separator. The liquid outlets are preferably arranged in a vertical median plane of the tank. Depending on the physical constraints of the particular application, however, a perfect central disposition of the liquid outlets may not be possible.

Where the tank is an elongate cylindrical tank having opposed end walls, the inlets are each disposed at a respective one of the end walls.

A tank in accordance with the present invention is generally mounted to an upper deck of a tanker or other ocean-going vessel. The tank has a longitudinal axis which is disposed in parallel to the longitudinal axis of the vessel. Since the pitching motion of a vessel is generally less than the rolling motion thereof, this disposition of the tank relative to the carrier vessel minimizes the motion which gives rise to sloshing of the liquids in the tank.

Preferably, the separation media include antifoam media at opposite ends of the tank and further include demisting media proximately to the median plane, on opposite sides thereof. The demisting media define a centrally located, chamber in which the liquid outlets are located.

In accordance with another feature of the present invention, the separator further comprises flow restrictors or regulators in the form of perforated plates disposed in the tank between the antifoam media and the demisting media. The perforated plates restrict, limit or regulate the flow of liquid along a fluid path from the inlets at the ends of the tank towards the water and oil outlets at or near the center of the tank, so as to prevent precipitous rushes of liquid induced by the heaving, pitching and rolling of a vessel on which the separator is located.

Preferably, the perforated plates extend up through a separated liquid region in the tank to a point located above an uppermost liquid level. This prevents liquid from washing over the perforated plates even in high seas.

Like the separation media, the perforated plates are located at least approximately symmetrically about a central transverse plane of the tank, thereby enhancing or assisting in the generation of a symmetrical flow and weight distribution for motion insensitivity.

It is contemplated that the antifoam media, the demisting media and the additional media also extend up through a separated liquid region in the tank to a point located above an uppermost liquid level. Preferably, at least the demisting media extend transversely across the tank from the bottom to the top thereof.

In a three-phase separator in accordance with the present invention, simultaneous infeed from opposite ends of the tank offers reduced size and weight as compared to other designs, for example, those in which a central separator plate and flapper valves are provided. The separation media and perforated plates minimize the effects of vessel motion. Moreover, the separator can be smaller for a given volumetric flow rate than conventional designs.

DESCRIPTION OF THE PREFERRED EMBODIMENTS

Figure 1:
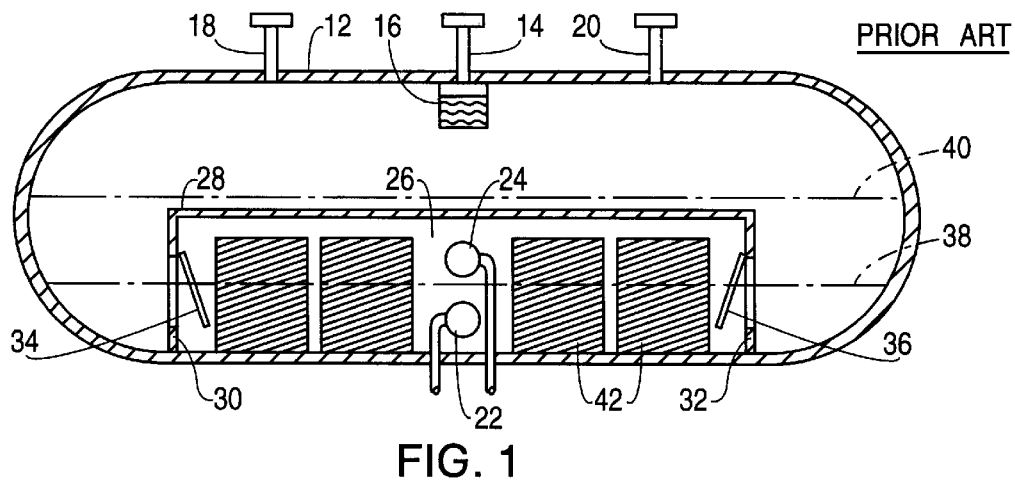
FIG. 1 is a schematic longitudinal cross-sectional view of a conventional three-phase separator.
Figure 2:
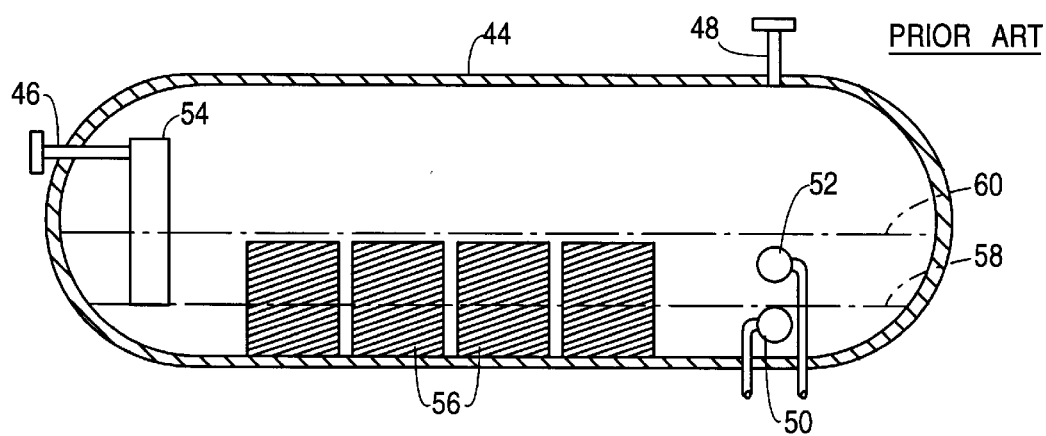
FIG. 2 is a schematic longitudinal cross-sectional view of another conventional three-phase separator.
Figure 3:
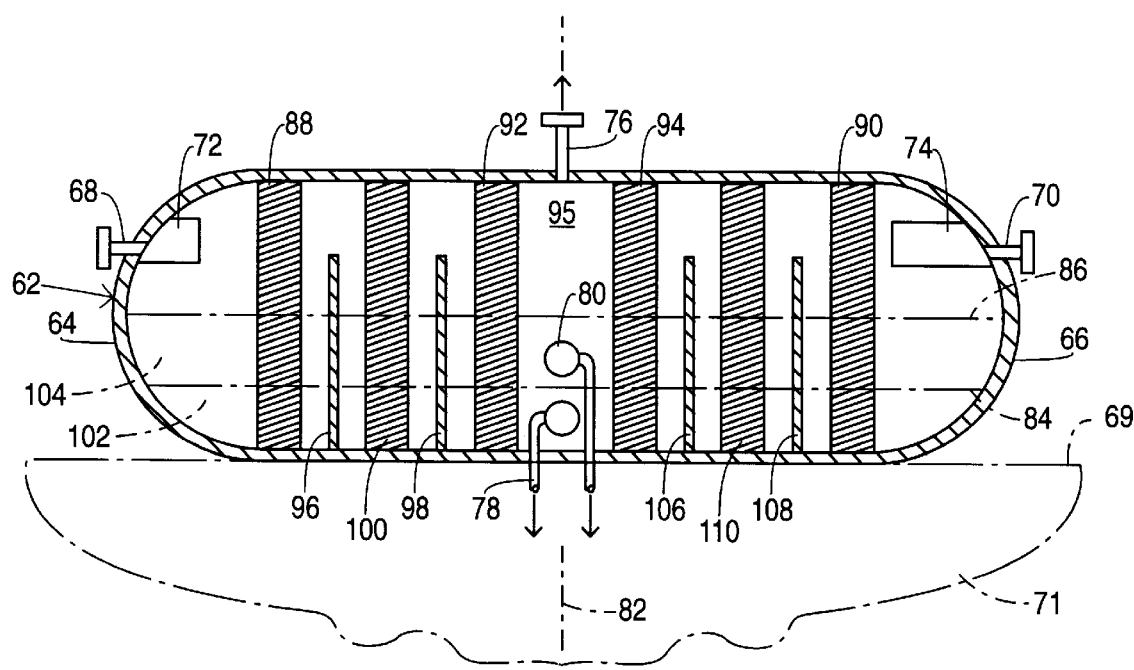
FIG. 3 is a schematic longitudinal cross-sectional view of a three-phase separator in accordance with the present invention.

As illustrated in FIG. 3, a three-phase separator particularly for use in marine applications comprises an elongate tank 62 having end walls 64 and 66 in which opposed inlets 68 and 70 are located for delivering a fluid mixture to the tank. Tank 62 is disposed on an upper deck 69 of a vessel 71 at sea so that a longitudinal axis (not depicted) of the tank is oriented substantially horizontally and parallel to a longitudinal (fore-aft) axis of vessel 71. It is contemplated that a production fluid mixture produced from an oilfield for phase separation is divided into two roughly equal streams which are guided to inlets 68 and 70, respectively. Baffle plates 72 and 74 are provided at the inlets 68 and 70. Alternatively, cyclonic preseparator inlet devices (see 54 in FIG. 2) may be disposed at inlets 68 and 70.

A gas outlet 76, a water outlet 78, and an oil outlet 80 are disposed centrally in tank 62, generally in a central or median plane 82 located midway between ends walls 64 and 66 and hence midway between inlets 68 and 70. Gas outlet 76 is located along an upper side (not designated) of tank 62, while water outlet 78 is located at a bottom of tank 62, below a water level or water-oil interface 84, oil outlet 80 being located between water level 84 and an oil level or oil-gas interface 86.

A pair of antifoam media, such as packing lattices 88 and 90, are provided at opposite ends of tank 62, proximately to respective fluid inlets 68 and 70, for coalescing and separating density differentiated components of the production fluid mixture arriving via inlets 68 and 70 and for inhibiting or preventing the generation of foam at the ends of tank 62. Packing lattices 88 and 90 extend the entire transverse dimension of height of tank 62, from a lower side or bottom thereof to an upper side or top of the tank.

Demisting media, such as packing lattices 92 and 94, are provided in the center of the tank, on opposite sides of median plane 82 for reducing liquid entrainment in the separated gas, i.e., for inducing the precipitation of water and oil phases from gas located at the top of tank 62. Packing lattices 92 and 94 also extend the entire transverse dimension of height of tank 62, from a lower side or bottom thereof to an upper side or top of the tank. Packing lattices 92 and 94 define a generally centrally located chamber 95 in which water outlet 78 and oil outlet 80 are located. Preferably, gas outlet 76 also communicates with or is located in chamber 95.

Provided between antifoam packing lattice 88 and demisting packing lattice 92 on the one side of tank 62 are a pair of flow restrictors or regulators, such as perforated plates 96 and 98, and an additional packing lattice 100. Plates 96 and 98 and lattice 100 extend up through the separated water and oil regions 102 and 104 in tank 62 to a point located above the uppermost liquid level, i.e., above oil level 86. Plates 96 and 98 permit a regulated flow of liquid in a longitudinal direction, from inlets 68 and 70 towards water and oil outlets 78 and 80 at the center of tank 62, but damp or inhibit motion induced bulk liquid movement induced by the heaving, pitching and rolling of a vessel on which the separator is located. The heights of the perforated plates 96 and 98 prevent liquid from washing over the perforated plates even in high seas.

Between antifoam packing lattice 90 and demisting packing lattice 94 on the other side of tank 62 are provided additional flow regulators, such as a pair of perforated plates 106 and 108, and media such as packing lattice 110. Plates 106 and 108 and lattice 110 also extend up through water and oil regions or layers 102 and 104 in tank 62 to points located above oil level 86.

Demisting media or packing lattices 92 and 94, antifoam media or packing lattices 88 and 90, perforated-plate flow restrictors or regulators 96, 98, 106, 108, and additional packing lattices 100 and 110 are disposed mirror symmetrically about plane 82, thereby providing for a symmetrical flow and weight distribution for motion insensitivity. Preferably, inlets 68 and 70 are disposed substantially equidistantly from at least liquid outlets 78 and 80.

Antifoam packing lattices 88 and 90 and demisting packing lattices 92 and 94, as well as additional packing lattices 100 and 110, are substantially thicker than perforated plates 96 and 98, for example, on the order of twenty times as thick. For example, the packing lattice may be 20 cm thick, while the perforated plate is 1 cm thick. The perforated plate may be formed with ¾ inch diameter holes on 1½ inch triangular pitch. Antifoam packing lattices 88 and 90 and demisting packing lattices 92 and 94, as well as additional packing lattices 100 and 110, can take any conventional form, such as in-parallel arrays of inclined corrugated plates. Structured packing elements of 250 Y Mellapack (Sulzer) in polypropylene have been used in experimental tests. Examples of possible packing structures are disclosed in detail in U.S. Pat. No. 1,458,805 to Christiansen, U.S. Pat. No. 1,732,386 to Sprockhoff, U.S. Pat. No. 1,946,414 to Schmid, U.S. Pat. No. 3,346,122 to Cornelissen, U.S. Pat. No. 3,837,501 to Pielkenrood, and U.S. Pat. No. 4,737,288 to Melis et al. The disclosures of all these patents are hereby incorporated by reference.

Although the invention has been described in terms of particular embodiments and applications, one of ordinary skill in the art, in light of this teaching, can generate additional embodiments and modifications without departing from the spirit of or exceeding the scope of the claimed invention. For example, one or more additional flow restricting or regulating perforated plate sections may be disposed in respective longitudinal planes in tank 62. Such longitudinal flow plates are particularly advantageous where measuring sensors or instruments are disposed in lateral walls of the tank. Otherwise, sloshing due to vessel rolling reduces the effectiveness of the instruments.

Gas outlet 76 need not be located in center plane 82 or even in chamber 95. However, a central location is preferred. In addition, liquid outlets 78 and 80 may be moved off center to some extent without appreciably affecting the balanced flow and weight distribution. Substantial centering for effective balancing of fluid flow and weight distribution is preferred.

Accordingly, it is to be understood that the drawings and descriptions herein are proffered by way of example to facilitate comprehension of the invention and should not be construed to limit the scope thereof.

What is claimed is:

1. A motion-insensitive phase separator for separating oilfield production fluid phases, comprising:

a tank having a pair of opposing inlets and further having at least one outlet for a liquid phase of a production fluid mixture fed into said tank simultaneously through said inlets, a flow path extending through said tank from said inlets to said outlet; and fluid permeable phase separation media disposed in said tank and extending across said flow path for separating the different phases of the production fluid mixture, said inlets being disposed substantially equidistantly from said outlet and said fluid permeable phase separation media being disposed in said tank generally symmetrically about said outlet so as to provide for a symmetrical flow and weight distribution for motion insensitivity.

2. The separator defined in claim 1 wherein said tank is elongate and has a substantially uniform transverse cross-section along said axis between opposite ends of said tank.

3. The separator defined in claim 2 wherein said tank is cylindrical and has opposed end walls, said inlets each being disposed at a respective one of said end walls.

4. The separator defined in claim 3 wherein said outlet is one of at least two outlets disposed approximately in a plane located substantially midway between said end walls.

5. The separator defined in claim 4 wherein said tank has a gas outlet located substantially midway between said end walls.

6. The separator defined in claim 1, further comprising at least two flow restrictors, each disposed between said outlet on one side and a respective one of said inlets on an opposite side.

7. The separator defined in claim 6 wherein said separation media include demisting media disposed proximately to said outlet, on opposite sides thereof.

8. The separator defined in claim 7 wherein said flow restrictors are each disposed between said demisting media on said one side and the respective one of said inlets on an opposite side.

9. The separator defined in claim 8 wherein said separation media further include two antifoam media each disposed towards a respective one of said inlets.

10. The separator defined in claim 9 wherein said flow restrictors are each disposed between said demisting media on said one side and a respective one of said antifoam media on said opposite side.

11. The separator defined in claim 6 wherein said flow restrictors each takes the form of a perforated plate.

12. The separator defined in claim 11 wherein each said perforated plate extends up through a separated liquid region in said tank to a point located above an uppermost liquid level.

13. The separator defined in claim 1 wherein said separation media include antifoam media disposed towards opposed inlets of said tank and demisting media disposed proximately to said outlet, on opposite sides thereof.

14. The separator defined in claim 13, further comprising flow regulators extending substantially vertically in said tank between said antifoam media and said demisting media.

15. The separator defined in claim 14 wherein said flow regulators comprise perforated plates extending up through a separated liquid region in said tank to a point located above an uppermost liquid level.

16. The separator defined in claim 13 wherein said separation media further comprise additional media disposed between in said tank between said antifoam media and said demisting media.

17. The separator defined in claim 16 wherein said additional media extend up through a separated liquid region in said tank to a point located above an uppermost liquid level.

18. The separator defined in claim 13 wherein said demisting media extend from a lower side to an upper side of said tank.

19. The separator defined in claim 13 wherein said antifoam media extend from a lower side to an upper side of said tank.

20. The separator defined in claim 1 wherein said separation media include antifoam media at opposite ends of said tank, said antifoam media extending from a lower side to an upper side of said tank.

21. The separator defined in claim 1 wherein said separation media include demisting media located proximately to said outlet, between said outlet and said inlets, said demisting media extending from a lower side to an upper side of said tank.

22. The separator defined in claim 1 wherein said fluid permeable phase separation media is disposed in said tank at least approximately mirror symmetrically with respective to a central transverse plane which bisects said tank.

23. A motion-insensitive phase separator for separating oilfield production fluid phase, comprising:

a tank having at least two inlets for a production fluid mixture and at least one outlet for a liquid phase of the production fluid mixture, a fluid flow path extending from said inlets to said outlet, said inlets being dispose on said tank substantially equidistantly from said outlet;

fluid permeable phase separation media dispose in said tank and extending across said flow path of the fluid for separating the different phase of the production fluid mixture, said fluid permeable phase separation media dispose in said tank generally symmetrically about said outlet so as to provide for a symmetrical flow and weight distribution for motion insensitivity; and at least two flow restrictors or regulators each disposed between said outlet on one side and a respective one of said inlets on an opposite side.

24. The separator defined in claim 23 wherein said separation media include demisting media disposed proximately to said outlet, on opposite sides thereof, s aid separation media further comprising two antifoam media each disposed towards a respective one of said inlets, said flow restrictors or regulators each being disposed between said demisting media on said one side and a respective one of said antifoam media on said opposite side.

25. The separator defined in claim 24 wherein said flow restrictors or regulators each takes the form of a perforated plate.

26. The separator defined in claim 25 wherein each said perforated plate extends up through a separated liquid region in said tank to a point located above an uppermost liquid level.

27. The separator defined in claim 26 wherein said tank is elongate and has a substantially uniform transverse cylindrical cross-section between opposite ends of said tank, said inlets each being disposed at a respective one of said ends.

28. The separator defined in claim 24 wherein said separation media further comprise additional media disposed between in said tank between said antifoam media and said demisting media.

29. The separator defined in claim 28 wherein said additional media extend up through a separated liquid region in said tank to a point located above an uppermost liquid level.

30. The separator defined in claim 23 wherein said separation media include demisting media extending transversely across said path from one side of said tank to an opposite side thereof.

31. The separator defined in claim 30 wherein said demisting media are disposed proximate to said outlet.

32. The separator defined in claim 23 wherein said separation media include antifoam media extending transversely across said path from one side of said tank to an opposite side thereof.

33. The separator defined in claim 32 wherein said antifoam media are disposed proximate to said inlets.

34. A motion-insensitive phase separator for separating oilfield production fluid phases, comprising:
   a tank having a pair of opposing inlets, said tank also having at least one outlet for a liquid phase of a production fluid mixture fed into said tank simultaneously through said inlets; and
   fluid permeable phase separation media disposed in said tank and extending across a flow path of the fluid from the inlets to the outlet for separating the different phases of the production fluid mixture, said fluid permeable separation media defining a substantially centrally located chamber inside said tank, said outlet being disposed in said chamber.

35. The separator defined in claim 34 wherein said separation media are disposed substantially mirror symmetrically about said chamber, so as to provide for a symmetrical flow and weight distribution for motion insensitivity.

36. The separator defined in claim 35, further comprising at least two flow restrictors, each disposed between said outlet on one side and a respective one of said inlets on an opposite side, said flow restrictors also being disposed substantially mirror symmetrically about said chamber, so as to provide for the symmetrical flow and weight distribution for motion insensitivity.

37. The separator defined in claim 36 wherein said flow restrictors are each disposed between said chamber on one side and a respective one of said inlets on an opposite side.

38. The separator defined in claim 37 wherein said separation media include demisting media and antifoam media, said demisting media being disposed on said one side of said flow restrictors, between said flow restrictors and said outlet, said antifoam media being disposed on said opposite side of said flow restrictors, between said flow restrictors and said inlets.

39. The separator defined in claim 38 wherein said flow restrictors each takes the form of a perforated plate.

40. The separator defined in claim 38 wherein said demisting media extend transversely across said flow path, from one side of said tank to an opposite side thereof, said antifoam media also extending transversely across said flow path, from the one side of said tank to the opposite side thereof.

41. An apparatus for separating oilfield production fluid phases, comprising:
   a vessel capable of being navigated onto large bodies of water;
   a tank fixed to said vessel, said tank having a pair of opposing inlets and further having at least one outlet for a liquid phase of a production fluid mixture fed into said tank simultaneously through said inlets, a fluid flow path extending through said tank from said inlets to said outlet; and
   fluid permeable phase separation media disposed in said tank and extending across said flow path for separating the different phases of the production fluid mixture, said inlets being disposed substantially equidistantly from said outlet and said fluid permeable phase separation media being disposed in said tank generally symmetrically about said outlet so as to provide for a symmetrical flow and weight distribution for motion insensitivity.

42. The separator defined in claim 41 wherein said separation media are disposed substantially mirror symmetrically about said outlet, so as to provide for a symmetrical flow and weight distribution for motion insensitivity.

43. The separator defined in claim 42, further comprising at least two flow restrictors, each disposed between said outlet on one side and a respective one of said inlets on an opposite side, said flow restrictors also being disposed substantially mirror symmetrically about said chamber, so as to provide for the symmetrical flow and weight distribution for motion insensitivity.

44. The separator defined in claim 43 wherein said separation media include demisting media and antifoam media, said demisting media being disposed on said one side of said flow restrictors, between said flow restrictors and said outlet, said antifoam media being disposed on said opposite side of said flow restrictors, between said flow restrictors and said inlets.

45. The separator defined in claim 44 wherein said flow restrictors each takes the form of a perforated plate.

46. The separator defined in claim 44 wherein said demisting media extend transversely across said flow path, from one side of said tank to an opposite side thereof, said antifoam media also extending transversely across said flow path, from the one side of said tank to the opposite side thereof.

47. An apparatus for separating oilfield production fluid phases, comprising:
   a vessel capable of being navigated onto large bodies of water;
   a tank fixed to said vessel, said tank having at least one inlet for a production fluid mixture and at least one outlet for a liquid phase of the production fluid mixture, a fluid flow path extending from said inlet to said outlet;
   fluid permeable phase separation media disposed in said tank and extending across said flow path of the fluid for separating the different phases of the production fluid mixture; and
   at least one flow restrictors or regulator also disposed in said tank in the flow path of the fluid from said inlet to said outlet, said flow restrictors or regulator taking the form of a perforated plate.

48. The apparatus defined in claim 47 wherein said inlet is one of two inlets disposed on said tank substantially equidistantly from said outlet, said fluid permeable phase separation media being disposed in said tank generally symmetrically about said outlet so as to provide for a symmetrical flow and weight distribution for motion insensitivity, said flow restrictors or regulator being one of two flow restrictors or regulators each disposed between said outlet on one side and a respective one of said inlets on an opposite side.

49. The apparatus defined in claim 48 wherein said separation media include demisting media disposed proximately to said outlet, on opposite sides thereof, said separation media further comprising two antifoam media each disposed towards a respective one of said inlets, said flow restrictors or regulators each being disposed between said demisting media on said one side and a respective one of said antifoam media on said opposite side.

50. The apparatus defined in claim 49 wherein said flow restrictors or regulators each takes the form of a perforated plate.

51. The apparatus defined in claim 50 wherein each said perforated plate extends up through a separated liquid region in said tank to a point located above an uppermost liquid level.

52. The apparatus defined in claim 51 wherein said tank is elongate and has a substantially uniform transverse cylindrical cross-section between opposite ends of said tank, said inlets each being disposed at a respective one of said ends.

53. The apparatus defined in claim 47 wherein said flow restrictors or regulator is one of two flow restrictors or regulators disposed in said tank and wherein said inlet is one of two inlets on said tank, said separation media including two antifoam media disposed towards respective ones of said inlets and demisting media disposed proximately to said outlet on opposite sides thereof, said flow restrictors or regulators being each disposed between said demisting media on one side and a respective one of said antifoam media on an opposite side.

54. The apparatus defined in claim 53 wherein said flow restrictors or regulators comprise perforated plates extending up through a separated liquid region in said tank to a point located above an uppermost liquid level.

55. The apparatus defined in claim 53 wherein said separation media further comprise additional media disposed between in said tank between said antifoam media and said demisting media.

56. The apparatus defined in claim 55 wherein said additional media extend up through a separated liquid region in said tank to a point located above an uppermost liquid level.

57. The apparatus defined in claim 47 wherein said separation media include demisting media extending transversely across said path from one side of said tank to an opposite side thereof.

58. The apparatus defined in claim 57 wherein said demisting media are disposed proximate to said outlet.

59. The apparatus defined in claim 47 wherein said separation media include antifoam media extending transversely across said path from one side of said tank to an opposite side thereof.

60. The apparatus defined in claim 59 wherein said antifoam media are disposed proximate to said inlet.

61. A motion-insensitive phase separator for separating oilfield production fluid phases, comprising:

a tank having at least one inlet for a production fluid mixture and at least one outlet for a liquid phase of the production fluid mixture, a fluid flow path extending from said inlet to said outlet;

fluid permeable phase separation media disposed in said tank and extending across said flow path of the fluid for separating the different phases of the production fluid mixture, said separation media include demisting media extending transversely across said path from one side of said tank to an opposite side thereof; and at least one flow restrictor or regulator also disposed in said tank in the flow path of the fluid from said inlet to said outlet.

62. A motion-insensitive phase separator for separating oilfield production fluid phases, comprising:

a tank having at least one inlet for a production fluid mixture and at least one outlet for a liquid phase of the production fluid mixture, a fluid flow path extending from said inlet to said outlet;

fluid permeable phase separation media disposed in said tank and extending across said flow path of the fluid for separating the different phases of the production fluid mixture, said separation media include antifoam media extending transversely across said path from one side of said tank to an opposite side thereof; and at least one flow restrictor or regulator also disposed in said tank in the flow path of the fluid from said inlet to said outlet.

* * * * *